United States Patent [19]
Young

[11] Patent Number: 5,887,689
[45] Date of Patent: Mar. 30, 1999

[54] AUTOMATICALLY ADJUSTING CLUTCH

[75] Inventor: Alastair John Young, Kenilworth, Great Britain

[73] Assignee: Automotive Products, PLC, Leamington Spa, England

[21] Appl. No.: 836,595

[22] PCT Filed: Sep. 16, 1996

[86] PCT No.: PCT/GB96/02280

§ 371 Date: May 15, 1997

§ 102(e) Date: May 15, 1997

[87] PCT Pub. No.: WO97/10448

PCT Pub. Date: Mar. 20, 1997

[30] Foreign Application Priority Data

Sep. 16, 1995 [GB] United Kingdom .................... 9518991

[51] Int. Cl.$^6$ .......................................................... F16D 13/75
[52] U.S. Cl. .................................... 192/70.25; 192/111 A
[58] Field of Search ............................ 192/70.25, 111 A

[56] References Cited

U.S. PATENT DOCUMENTS

| | | | |
|---|---|---|---|
| 2,207,051 | 7/1940 | Colman | 192/111 A |
| 2,241,223 | 5/1941 | Spase et al. | 192/111 A |
| 2,280,355 | 4/1942 | Spase et al. | 192/111 A |
| 5,069,322 | 12/1991 | Mizukami et al. | 192/70.25 |
| 5,090,536 | 2/1992 | Asada | 192/70.25 |
| 5,251,737 | 10/1993 | Flotow et al. | 192/111 A |
| 5,513,735 | 5/1996 | Uenohara | 192/111 A |

FOREIGN PATENT DOCUMENTS

| | | |
|---|---|---|
| 2345620 | 10/1977 | France . |
| 1403853 | 8/1975 | United Kingdom . |
| 2019957 | 11/1979 | United Kingdom . |
| 1567019 | 5/1980 | United Kingdom . |
| 2284025 | 5/1995 | United Kingdom . |

Primary Examiner—Richard M. Lorence
Attorney, Agent, or Firm—Paul E Milliken; Lee A Germain

[57] ABSTRACT

An automatically adjusting clutch (10) in which a pressure plate (13) is biased axially towards a flywheel (11) by a main clutch engaging spring (12) to clamp a driven plate between the pressure plate and flywheel to engage the clutch. A first part (30) of the pressure plate is moveable by an adjuster relative to a second part in the form of a pivot ring (40) of the pressure plate to increase the effective axial thickness of the pressure plate to compensate for the wear of the driven plate. The adjuster having an array of adjuster teeth (44) which are disposed circumferentially around the pivot ring (40) and one or more pawls (60) which move relative to and in contact with the array as the pressure plate moves relative to the flywheel. The pawl(s) and array are arranged so that if movement of the pressure plate towards the flywheel during clutch engagement exceeds a predetermined distance, indicating a predetermined amount of wear of the driven plate, the pawl(s) move sufficiently over the array to engage behind a tooth of the array so that subsequently the pawl(s) move the first part of the pressure plate relative to the second part to make the wear adjustment.

28 Claims, 13 Drawing Sheets

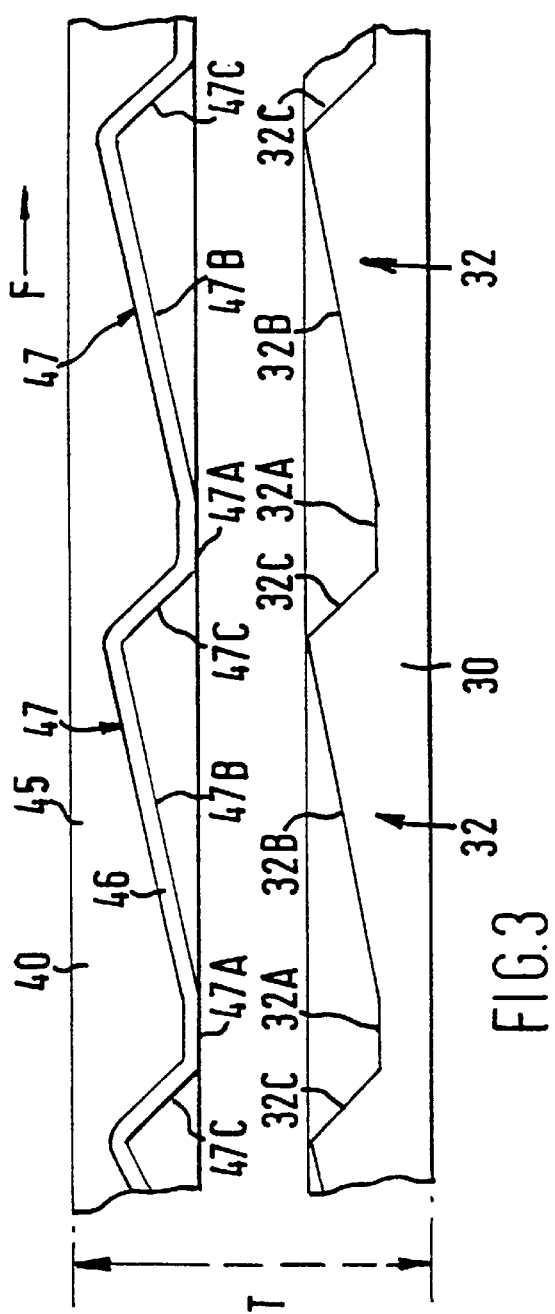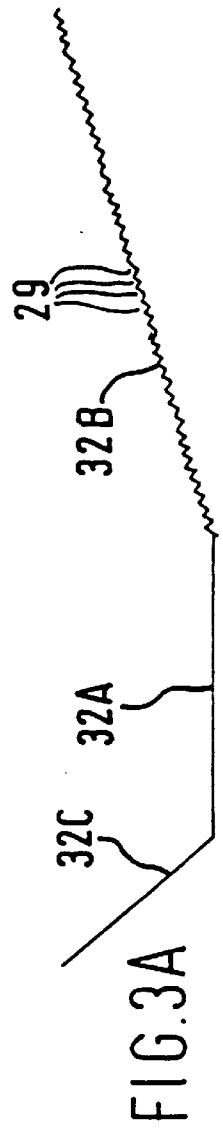

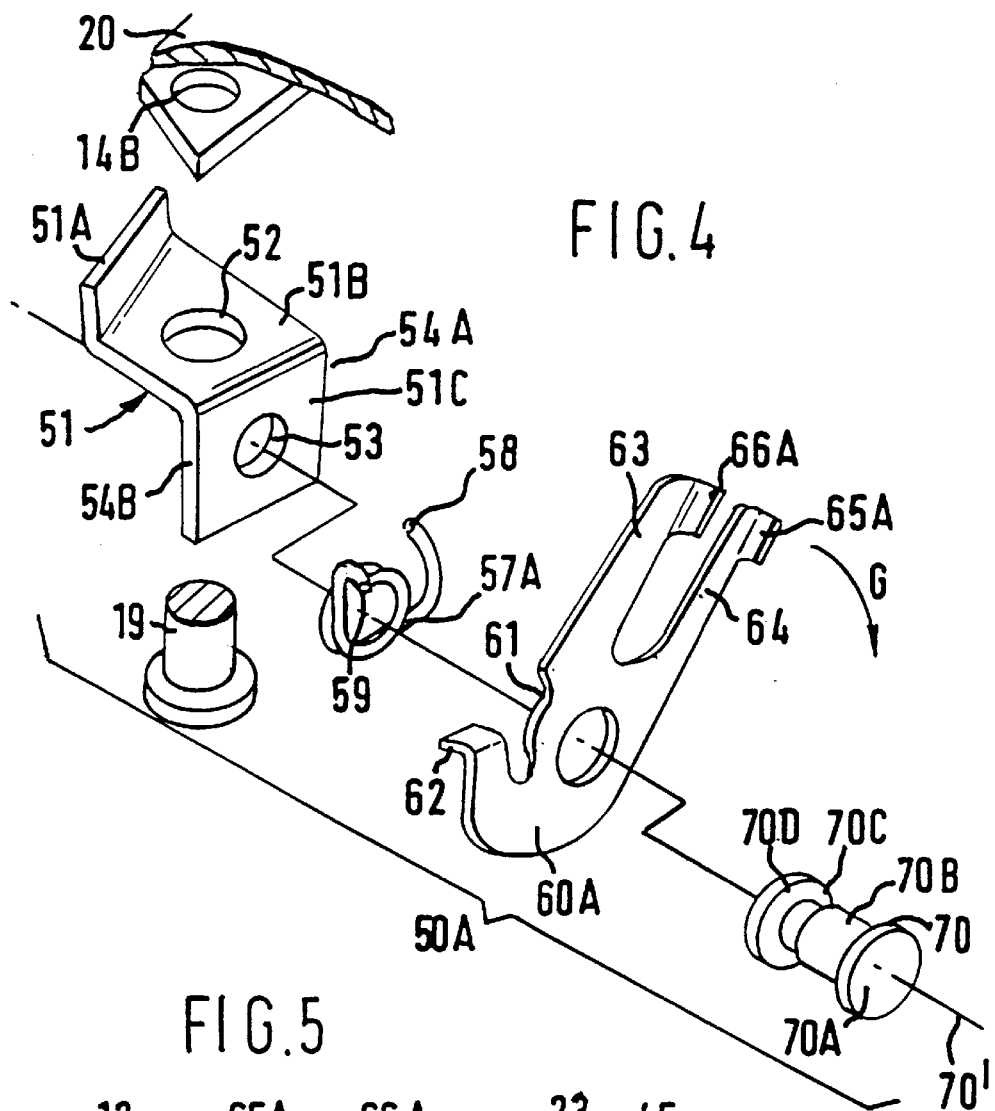
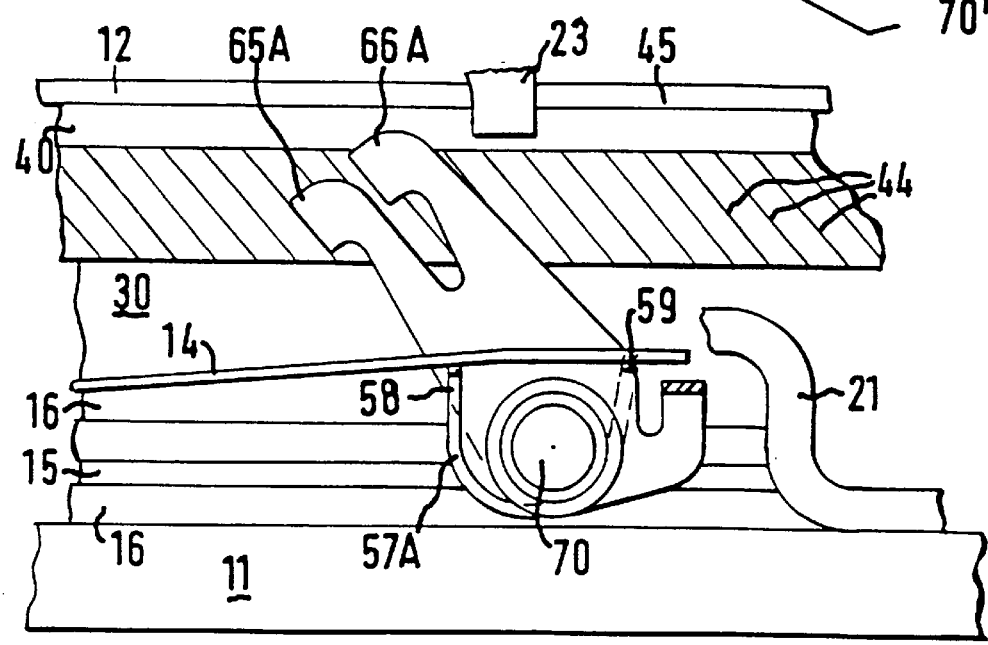

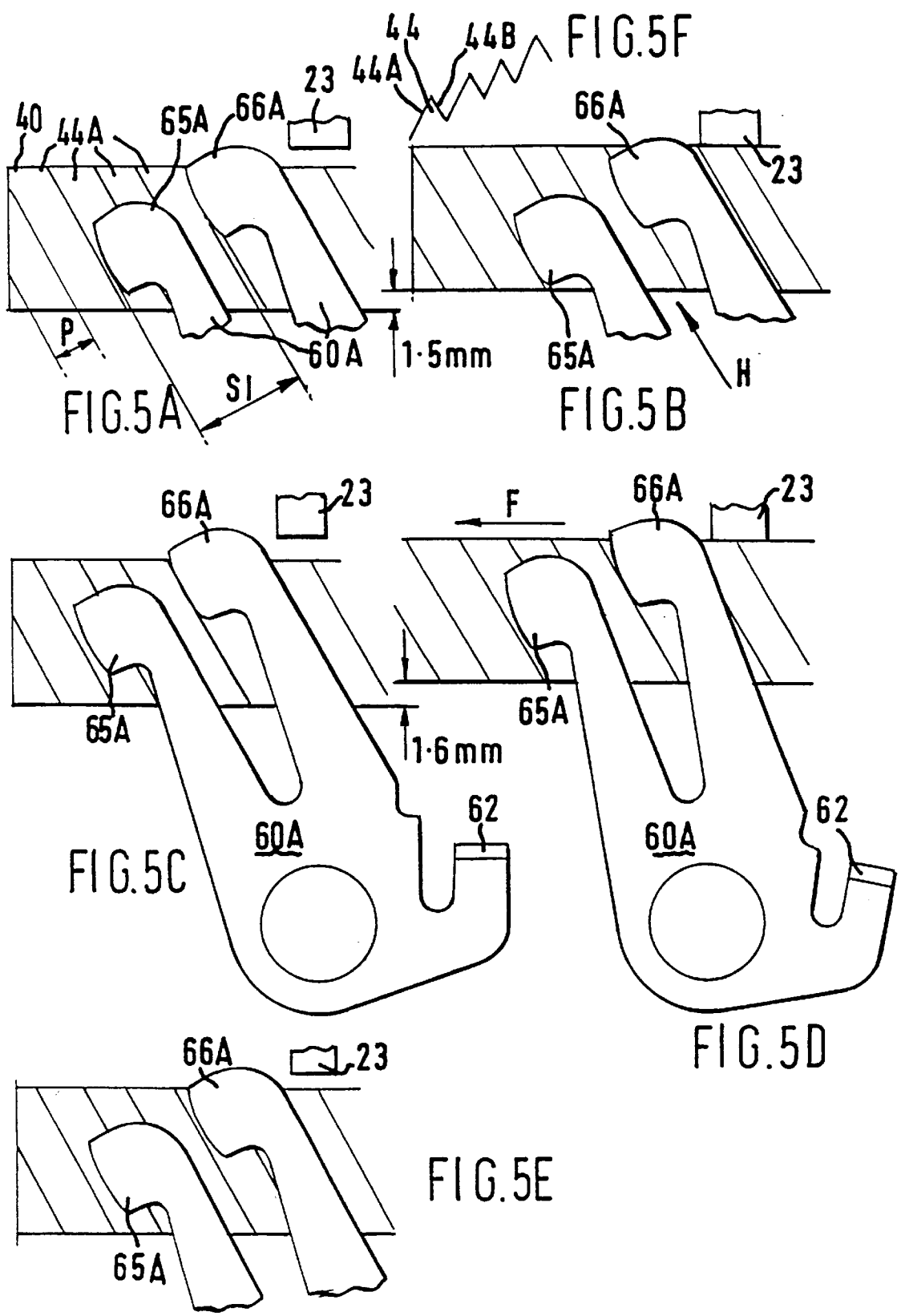

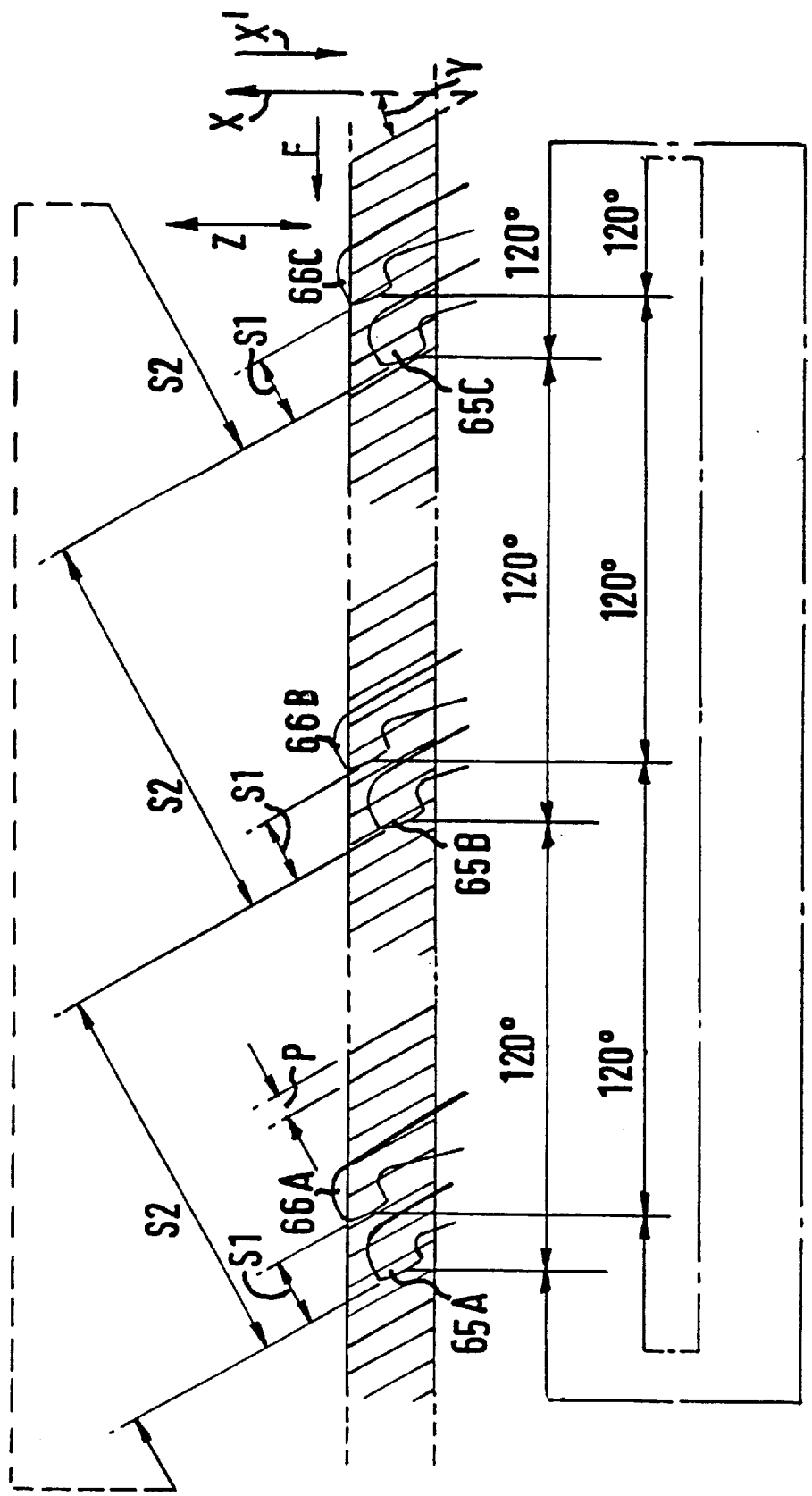

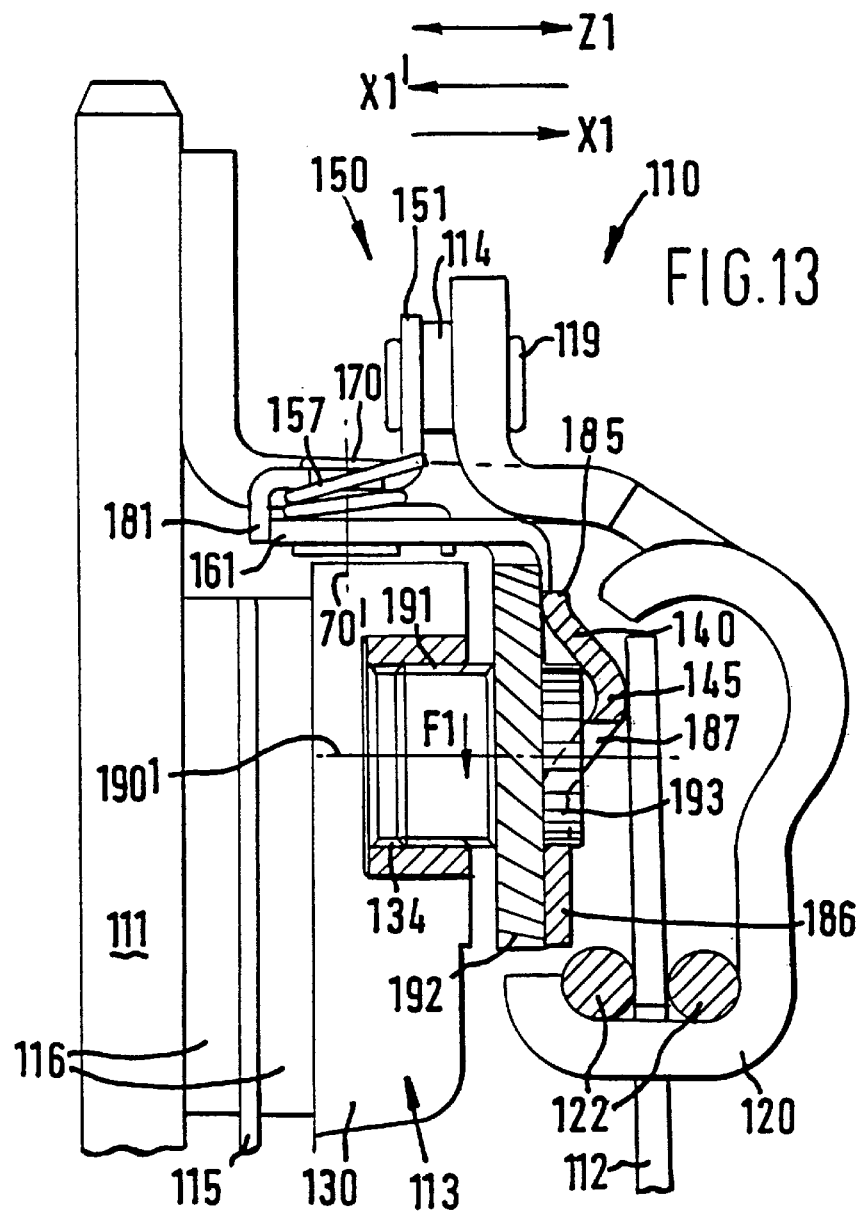
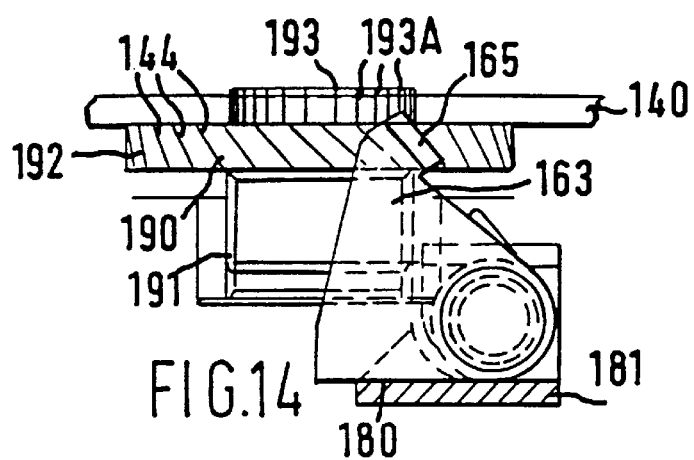

AUTOMATICALLY ADJUSTING CLUTCH

The present invention relates to automatically adjusting clutches, and in particular to clutches for use on motor vehicles.

Known automatically adjusting clutches are complicated and expensive to produce.

It is an object of the present invention to produce a simple and cheap automatically adjusting clutch which is reliable in operation.

An automatically adjusting clutch in which a pressure plate is biased axially towards a flywheel by a main clutch engaging spring means to clamp a driven plate between the pressure plate and flywheel to engage the clutch, a first part of the pressure plate which is moveable by adjuster means relative to a second part of the pressure plate to increase the effective axial thickness of the pressure plate to compensate for the wear of the driven plate, the adjuster-means having an array of adjuster teeth which are disposed circumferentially around a component which is rotatable about an axis parallel to the axis of rotation of the clutch and pawl means which moves relative to and in contact with the array as the pressure plate moves relative to the flywheel, the pawl means and array being arranged so that if movement of the pressure plate towards the flywheel during clutch engagement exceeds a predetermined distance, indicating a predetermined amount of wear of the driven plate, the pawl means moves sufficiently over the array to engage behind a tooth of the array so that subsequently the pawl means moves the first part of the pressure plate relative to the second part to make said wear adjustment.

The adjuster teeth of the array may be disposed at an angle inclined to an axis about which the array rotates during adjustment for example the teeth may be helical teeth.

Other dependent and independent aspects of the invention are defined in the accompanying claims.

The invention will be described by way of example only with reference to the accompanying drawings in which:

FIG. 3 is an exploded developed view of part of the pressure plate of FIG. 1 taken in the direction of arrows BB of FIG. 1A;

FIG. 3A is an enlarged view of a modified form of the first portion 30 of FIG. 3 taken in the direction of arrows BB of FIG. 1A;

FIG. 4 is an isometric exploded view of a pawl mechanism and associated components of the clutch of FIG. 1;

FIG. 5 is a radial view of part of the clutch of FIG. 1 in the direction of arrow C with bracket 51A not shown for clarity;

FIGS. 5A to 5E are a series of schematic radial views of the clutch of FIG. 1 in the direction of arrow C of FIG. 1A showing the following FIG. 5A—an unworn engaged clutch, FIG. 5B—an unworn disengaged clutch, FIG. 5C—a partially worn engaged clutch prior to adjustment, FIG. 5D—a partially worn disengaged clutch about to adjust, FIG. 5E—a partially worn engaged clutch;

FIG. 5F is a schematic view taken in the direction of arrow H of FIG. 5B showing the adjuster teeth;

FIG. 6 is a schematic developed view similar to the views of FIGS. 5A to 5E showing the relationship of the pawl teeth to the adjuster teeth of the clutch of FIG. 1;

Figure 12:
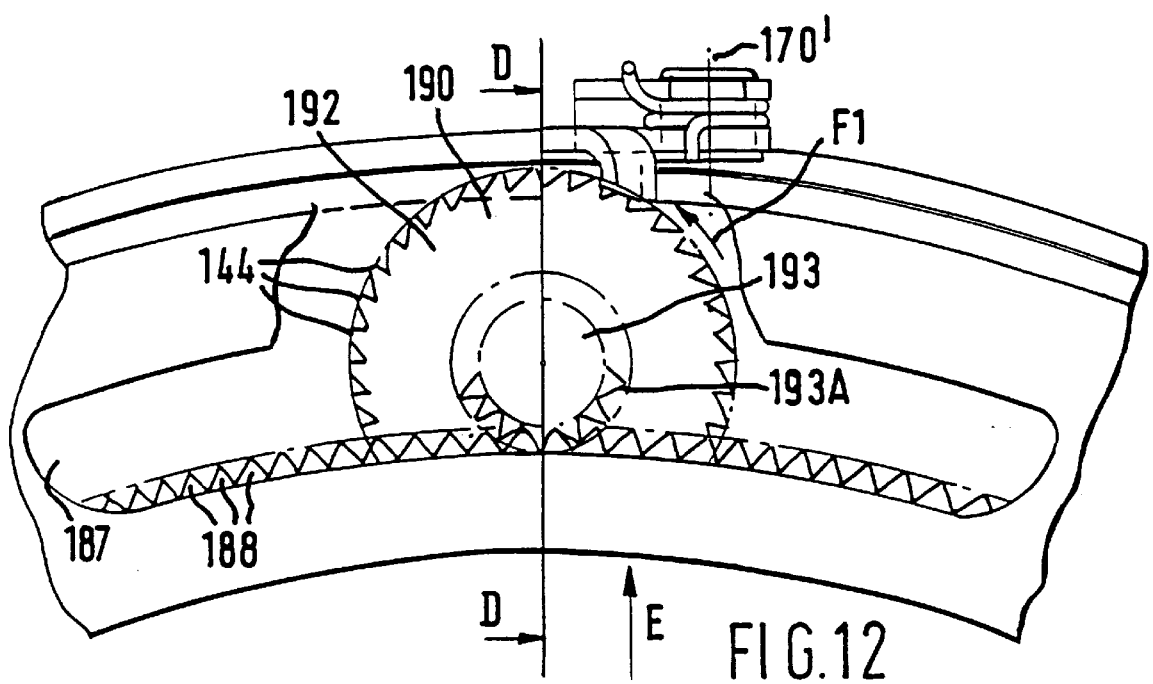
FIG. 12 is an axial view of part of a third embodiment of an automatically adjusting clutch according to the present invention looking towards an associated engine.

FIG. 13 is a cross section view of the clutch of FIG. 12 taken along the line DD of FIG. 12; and FIG. 14 is a radial view of the clutch of FIG. 12 taken in the direction of arrow E of FIG. 12 with the adjuster wheel 190 and annular mass 130 shown dotted so as not to obscure the pawl 160.

Figure 15:
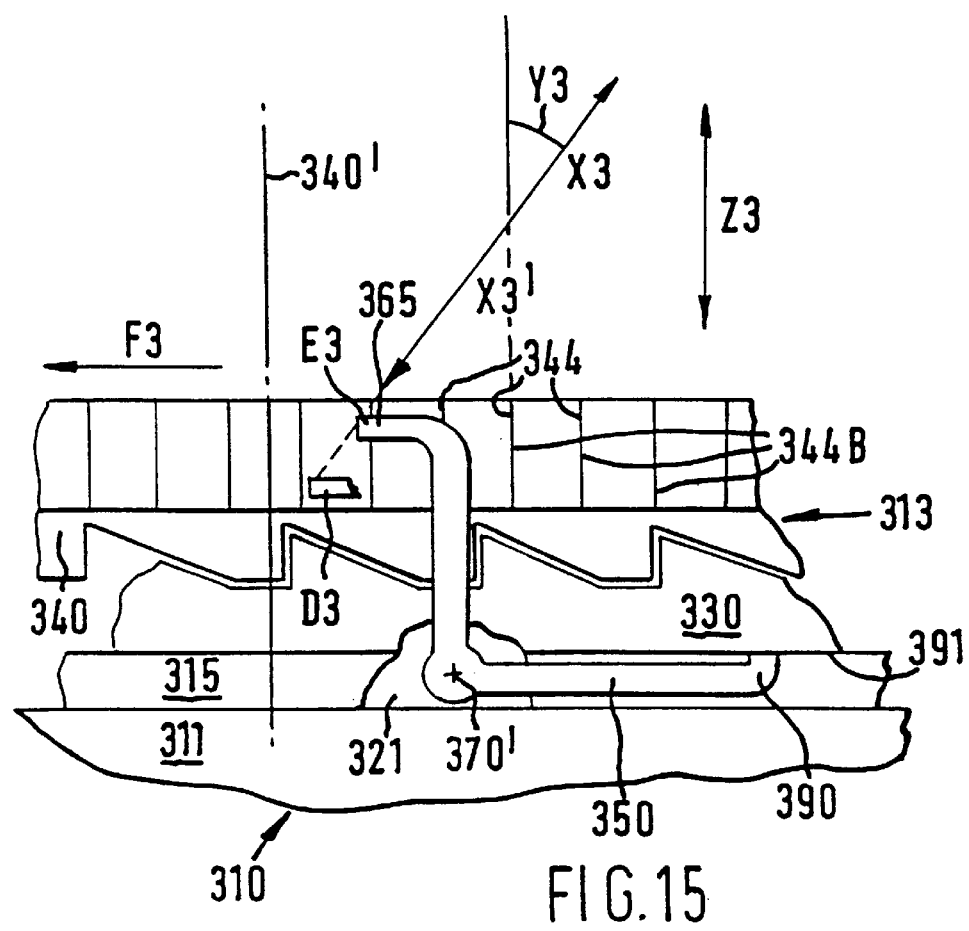

FIG. 15 is a schematic radial view of a fourth embodiment of an automatically adjusting clutch according to the present invention.

With reference to FIGS. 1 to 6 there is illustrated an automatically adjusting clutch 10 which includes a flywheel 11, a clutch cover assembly 20 and a driven plate 15. The flywheel 11 is fixed to the end of a crankshaft (not shown) of an associated internal combustion engine.

The clutch cover assembly 20 comprises a clutch cover 21, a diaphragm spring 12, a pressure plate 13, torque straps 14 and pawl mechanisms 50A, 50B, 50C which form part of an adjuster means. The clutch cover 21 is fixed rotationally and axially fast to the flywheel 11 by bolts (not shown) and supports the diaphragm spring 12 via two support rings 22 situated one on each axial side of the diaphragm spring 12 in a manner well known in the art. The diaphragm spring biases the pressure plate 13 towards the flywheel 11. The clutch driven plate 15 is situated between the pressure plate 13 and flywheel 11 and is connected to the input shaft of a gear box (not shown). When the clutch is engaged i.e. the diaphragm spring 12 biases the pressure plate 13 towards the flywheel, power can be transmitted between the associated engine and gearbox.

By applying an axial force to the fingers 12A of the diaphragm spring 12 towards the flywheel 11 the clutch can be disengaged in a manner well known in the art.

The pressure plate 13 comprises a first part 30 coaxial with a second part in the form of a pivot ring 40. First part 30 is generally annular in shape and has significant thermal mass and is thus capable of absorbing heat generated by frictional contact with the adjacent friction facing 16 of the driven plate 15 during engagement and disengagement of the clutch 10. On the radially outer periphery of the first part 30 there are three circumferentially equi-spaced lugs 31. Each lug is fixed to one end 14A of a tangentially orientated torque strap 14 by a rivet 18. The other end 14B of the strap 14 is fixed to the clutch cover 21 by a rivet 19. The straps 14 ensure the first part 30 remains concentric with and rotationally fast with the clutch cover 21 but allow axial movement of the first part 30 relative to the clutch cover 21. When the clutch is engaged the straps 14 are stressed and bias the first part 30 away from the flywheel. This biasing assists in separating the first part 30 from the driven plate 15 when the clutch is disengaged.

On the axial side of the first part 30 remote from the flywheel 11 there is a circumferentially arranged annular array of nine undulations 32 (see FIGS. 1 and 3), facing towards the diaphragm spring 12. In cross section each undulation consists of a relatively short flat section 32A, a relatively long ramp section 32B of a relatively shallow gradient and a relatively short ramp section 32C of relatively steep gradient which joins adjacent ramp sections 32B and flat sections 32A of adjacent undulations 32.

Figure 2:
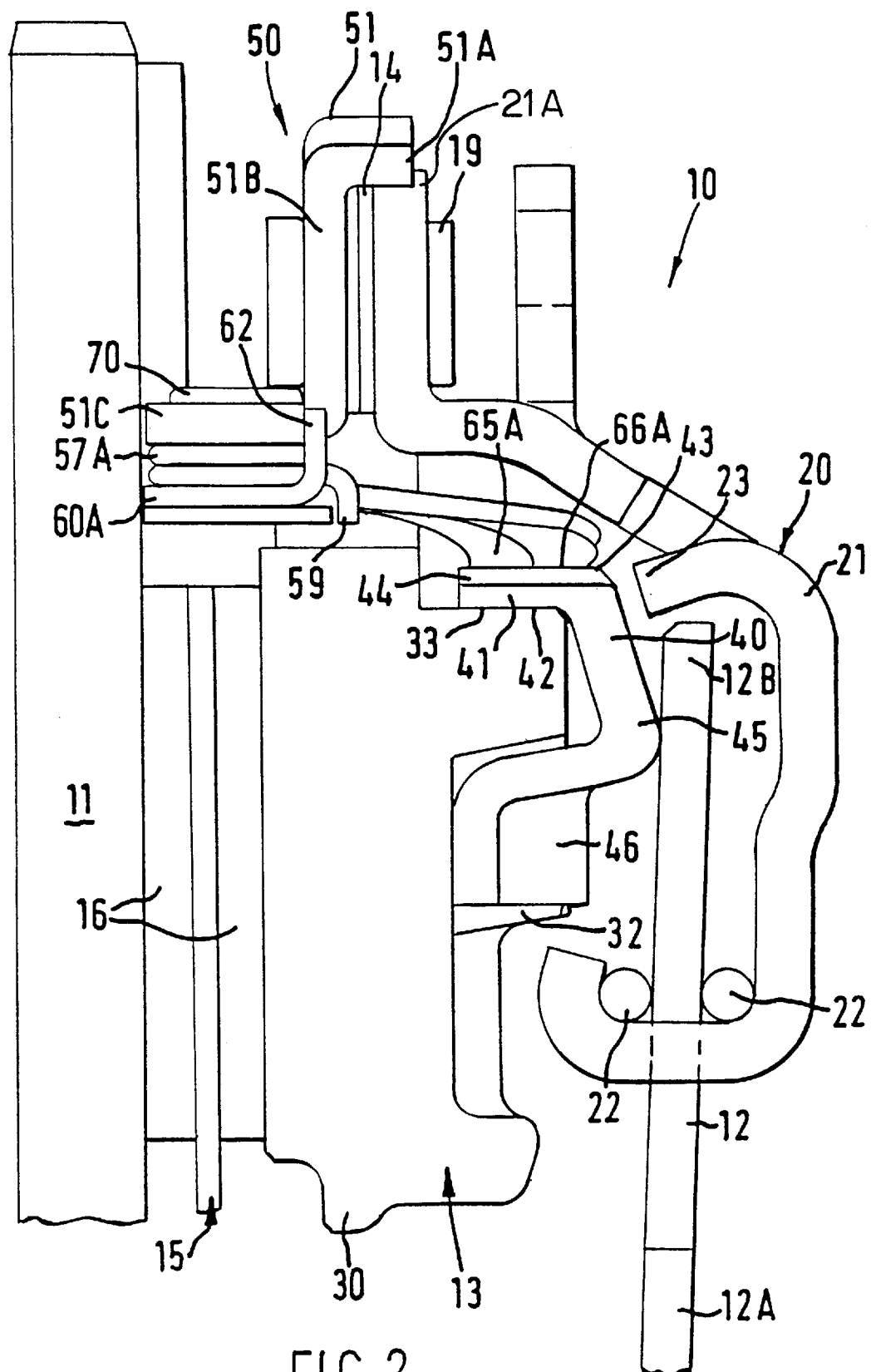
FIG. 2 is a cross section view of the clutch of FIG. 1 taken along the line AA of FIG. 1A.

A portion of the outer periphery of the first part remote from the flywheel is formed as an annular spigot 33 (see FIG. 2).

Pivot ring 40 is annular in shape and may be made as a pressing. The radially outer section 41 (see FIG. 2) is formed parallel and concentric to the axis of the clutch 10. The radially inner surface 42 of the outer section 41 is formed as an annular recess which engages with the spigot 33 to keep the pivot ring 40 concentric with the first part 30. The outer surface 43 of the outer section 41 has a continuous circumferentially orientated array of pivot ring adjuster teeth 44 each tooth being of part helical form. In this case there are 241 teeth in total. Each tooth has a flank portion 44A of relatively low gradient and an edge portion 44B of relatively steep gradient (see FIG. 5F).

The radially outer section 41 is connected to a pivot section 45 of the pivot ring 40. This pivot section 45 is contacted by the radially outer portion 12B of the diaphragm spring 12 and as the clutch 10 is engaged and disengaged the spring rotates about the pivot section 45.

The pivot section 45 is connected to a radially inner section 46 which has a circumferentially arranged annular array of 9 undulations 47 (see FIG. 3), which face and contact the undulations 32.

When the clutch is assembled with new, unworn components flat section 47A, ramp section 47B and ramp section 47C of each undulation 47 face corresponding flat section 32A, ramp section 32B and ramp section 32C of undulations 32.

It will be apparent that relative rotation of the pivot ring 40 about its axis 40' (see FIG. 1) in the direction of arrow F of FIG. 3 relative to the first part 30 will cause ramp sections 47B to slide across ramp sections 32B and the effective axial thickness T of the pressure plate 13 will increase. The design is such that when the driven plate friction facings 16 are worn to their design limit there is still sufficient overlapping contact of ramp sections 32B, 47B.

When ramp sections 32B are in contact with ramp sections 47B and the clutch is engaged, the clamp load path of the diaphragm spring passes from ramp section 32B to ramp section 47B. This clamp load tends to rotate the pivot ring 40 relative to the first portion 30 to reduce the effective axial thickness of the pressure plate 13. This potential reduction in pressure plate thickness is resisted by friction between ramp sections 32B and 47B and between the pivot 45 and diaphragm spring 12. It can be advantageous to manufacture each ramp section 32B and 47B with serrations, 29 (see FIG. 3A) preferably radial serrations so as to prevent back rotation of the pivot ring once the clutch is engaged. Similarly serrations could be formed on the pivot ring pivot 45 and the contacting surface of the belleville spring.

It is preferable that the circumferential angle between adjacent serrations as measured at the centre of the clutch is equal or less than the angle through which the pivot ring rotates as a result of one adjustment though this need not be the case.

In a further modification an independent ratchet mechanism could be used to prevent back rotation of the pivot ring.

In operation the relative rotation of the second part of the pressure plate (pivot ring 40) about axis 40' relative to the first part (30) is effected by three identical pawl mechanisms 50A, 50B and 50C which cause the pressure plate to increase in thickness incrementally by an amount substantially similar to the decrease in thickness of the friction facings 16 as wear takes place.

Pawl mechanism 50A is built as a sub-assembly and consists of a bracket 51 a pawl means 60A a pawl bias means 57A and a pawl rivet 70 (see FIG. 4).

The bracket 51 is formed from sheet metal with three flat portions 51A, 51B, and 51C. Flat portions 51A and 51C are bent at 90 degrees to and adjoin flat portion 51B.

Flat portion 51B has a hole 52 through which passes the rivet 19. The rivet 19 serves to fix the bracket 51 and end 14B of a strap 14 to the clutch cover 21. The flat portion 51A lies in close proximity to the locally straight edge 21A of the clutch cover and ensures that the bracket 51 can not rotate about the axis of the rivet 19. Flat portion 51C faces substantially radially inwards and has a hole 53.

The pawl rivet 70 is formed in 4 sections, rivet heads 70A and 70D and shank portions 70B and 70C. Rivet head 70D and shank portions 70B and 70C serve to retain the rivet 70 fast in hole 53. Mounted on shank portion 70B adjacent the bracket 51 is the pawl bias means 57A, in the form of a coil spring. The pawl means 60A is also mounted on shank portion 70B and is between the pawl bias means 57A and the rivet head 70A. The pawl means can rotate to a limited extent on rivet 70 about rivet axis 70'. One end 58 of pawl bias means 57A engages an edge 54A of flat portion 51C. The other end 59 of pawl bias means 57A is bent to engage an edge 61 of the pawl means 60A. The pawl bias means 57A is stressed (or pre-tensioned) so as to bias the pawl means 60A in the direction as indicated by arrow G of FIG. 4. Rotation of the pawl means 60A is limited in this direction by a stop in the form of bent tab 62 on the pawl means 60A contacting an edge 54B of the flat portion 51C.

The pawl means 60A has two arms 63 and 64 with respective pawl teeth 65A, 66A at one end of the arms 63, 64. The pawl means 60A is made from a resilient material such as spring steel and as such the arms 63 and 64 can move axially, having regard to the pawl rivet 70 axis, independently to a limited extent. Each arm 63, 64 is arranged to bias its corresponding pawl tooth 65A, 66A in a direction parallel to the axis 70' about which the pawl rotates into engagement with the array of adjuster teeth 44 of the pivot ring 40 of the pressure plate 13. Note however that the spacing S1 between teeth 65A and 66A is out of phase with the pitch P of the adjuster teeth 44, teeth 65A and 66A being spaced 2⅔ (i.e. 8/3) times the pitch of teeth adjuster 44 (see FIG. 5A).

Pawl mechanism 50B consists of bracket 51, pawl means 60B, pawl bias means 57B and pawl rivet 70, and pawl mechanism 50C consists of bracket 51 pawl means 60C, pawl bias means 57C and pawl rivet 70. Pawl means 60B carries pawl teeth 65B and 66B and pawl means 60C carries pawl teeth 65C and 66C.

Pawl mechanisms 50A, 50B and 50C are all identical and are spaced at 120 degrees around the circumference of the clutch, thus pawl teeth 65A, 65B, and 65C are similarly spaced at 120 degrees as are pawl teeth 66A, 66B 66C. Because there are 241 pivot ring adjuster teeth 44 the spacing between pawl teeth 65A and 65B is out of phase with the pitch of the adjuster teeth 44, the spacing S2 between pawl teeth 65A and 65B being 80⅓ (i.e. 241/3) times the pitch of adjuster teeth 44 (see FIG. 6). Similarly the spacing between pawl teeth 65B and 65C, and between 65C and 65A is also 80⅓ (i.e. 241/3) times the pivot ring adjuster teeth pitch. Also it is apparent that the spacing between pawl teeth 66A and 66B, 66B and 66C, 66C and 66A is 80⅓ (i.e. 241/3) times the pivot ring adjuster teeth pitch.

However the spacing between pawl tooth 65A and 66B is 80⅓ plus 2⅔ (i.e. 241/3 plus 8/3 =249/3) i.e. 83 times the pivot ring adjuster teeth pitch and they are thus in phase with each other having regard to the adjuster teeth 44. Similarly pawl teeth 65B and 66C are in phase as are pawl teeth 65C and 66A.

Operation of the auto-adjust clutch is as follows:

Considering pawl mechanism 50A with the clutch in an unworn condition and engaged, pawl teeth 65A and 66A lie on flanks 44A of adjuster teeth 44 as shown in FIG. 5A. As the clutch is disengaged the pressure plate 13 moves axially away from the flywheel 11 until the pivot ring 40 contacts a stop means 23 carried by the clutch cover 20 (see FIG. 5B). During disengagement the pawl teeth 65A and 66A slide across corresponding flanks 44A of adjuster teeth 44. Because of the helix angle of the adjuster teeth 44 the pawl teeth are effectively sliding away from the edge 44B of the adjuster tooth corresponding to the flank on which they are engaged. During the whole of the disengagement movement of the pivot ring (in this case 1.5 mm) the teeth 65A,66A remain on their appropriate flank 44A. Note that the relative direction of movement between the pawl means and the array of adjuster teeth during this non adjusting disengagement operation is in the direction of arrow X (see FIG. 6).

When the clutch is engaged the pressure plate 13 moves towards the flywheel and the pawl teeth slide relative to and across the corresponding flank 44A on adjuster teeth 44 in the direction X' until the fully engaged position is achieved.

When wear of the friction facings 16 has taken place and the clutch is engaged the pivot ring will be slightly closer to the flywheel by an amount equal to the amount of wear of the friction facings and during the subsequent disengagement of the clutch, the disengagement movement of the pivot ring will be greater by the amount of wear that has taken place.

Once a predetermined amount of wear of the friction facings 16 has taken place (in this case 0.1 mm) the engaged position of the pivot ring 40 is sufficiently close to the flywheel for the pawl tooth 66A to slide past the flank 44A and engage with the edge 44B of the corresponding adjuster tooth (see FIG. 5C), in other words the pawl tooth 66A engages behind the corresponding adjuster tooth. This effectively senses that a predetermined amount of wear has taken place.

Similarly the in phase tooth 65C of pawl mechanism 50C also engages behind a corresponding adjuster tooth. The following description of the operation of pawl tooth 66A is applicable to the operation of pawl tooth 65C in relation to its corresponding adjuster components.

During the next disengagement of the clutch (see FIG. 5D), the pawl tooth 66A is unable to slide past its freshly engaged adjuster tooth edge 44B and therefore the disengaging movement of the pivot ring 40 causes the pawl means 60A to rotate about the axis 70' of its pawl rivet 70 against the pretensioned pawl bias means 57A to provide a potential adjustment force and thus the corresponding tab 62 disengages the corresponding edge 54B. During this stage the stress in pawl bias means 57A is being reacted at the adjuster tooth edge 44B against which the pawl tooth 66A is contacting and sliding along.

Since the tooth edge 44B is helical there is a component of reaction force which tends to rotate the pivot ring in the direction F relative to the clutch.

There is also a component of the reaction force which biases the pivot ring towards the flywheel. To ensure that the pressure plate disengages the driven plate correctly, the force created by the torque straps forcing the pressure plate away from the flywheel must be greater than the component of force on the pressure plate towards the flywheel created by the in phase pawl teeth (eg 66A and 65C) of any two pawl means which are about to cause adjustment of the pivot ring.

When the clutch is fully disengaged the pivot ring 40 is no longer clamped between the first part 30 and the diaphragm spring 12 and is able to rotate in the direction F about the axis 40' relative to the first portion under the influence of the pawl bias means 60A until the corresponding tab 62 re-engages with corresponding edge 54B.

The clutch is designed such that the amount by which the pivot ring 40 is caused to rotate relative to the first part 30 produces an increase in effective thickness of the pressure plate 13 substantially equal to the amount of wear of the friction facings 16. Thus when the clutch is re-engaged the pivot ring 40 is axially in its "unworn engaged" position (see FIG. 5D). It is apparent that the pawl mechanism provides automatic adjustment of the clutch 10.

As previously described pawl tooth 66A is in phase with pawl tooth 65C, and once the pre-determined amount of wear has taken place pawl tooth 65C engages with a corresponding adjuster tooth edge 44B and consequently when the clutch is fully disengaged pawl bias means 57C assists in the rotation of the pivot ring 40 relative to the first part 30.

Following a further pre-determined amount of wear, a further adjustment of the effective thickness of the pressure plate 13 takes place under the influence of pawl teeth 65B, and 66C.

The next adjustment takes place under the influence of pawl teeth 65A and 66B. The adjustment sequence then starts again with pawl teeth 66A and 65C.

Note that after two adjustments by pawl means 60A pawl tooth 65A is abutting an adjuster tooth flank 44A which pawl tooth 66A has previously abutted and potentially worn. However since the pawl teeth 65A and 66A are axially separated (having regard to the axis of the clutch) pawl tooth 65A only contacts an unworn portion of said previously abutted flank 44A.

It will be noted that during an adjustment the direction of movement of the array of adjuster teeth (direction F) is substantially at 90 degrees to the direction of movement of the array of adjuster teeth during a non adjusting clutch engagement or disengagement operation (direction Z) and also at 90 degrees to the relative direction of movement between the array of adjuster teeth and pawl means during a non-adjusting clutch engagement (direction X') or disengagement (direction X) In this case the arrow Z is parallel to the arrows X and X'. Furthermore the edges 44B of the adjuster teeth 44 are inclined by the acute angle Y to the relative direction of movement between the array of adjuster teeth and the pawl teeth during a non adjusting disengagement operation (direction X) and during a non adjusting engagement operation (direction X'). Also the axis 70' about which the pawl means rotate (see FIG. 1) is not parallel (but inclined, in this case at 90 degrees) to the axis 40' about which the array of adjuster teeth rotate during adjustment (axis 40' being concentric with the axis about which the clutch rotates). The above design features allow the axial movement of the pressure plate and pivot ring 40 to be directly utilised in creating a rotational movement of the pivot ring 40.

Figure 7:
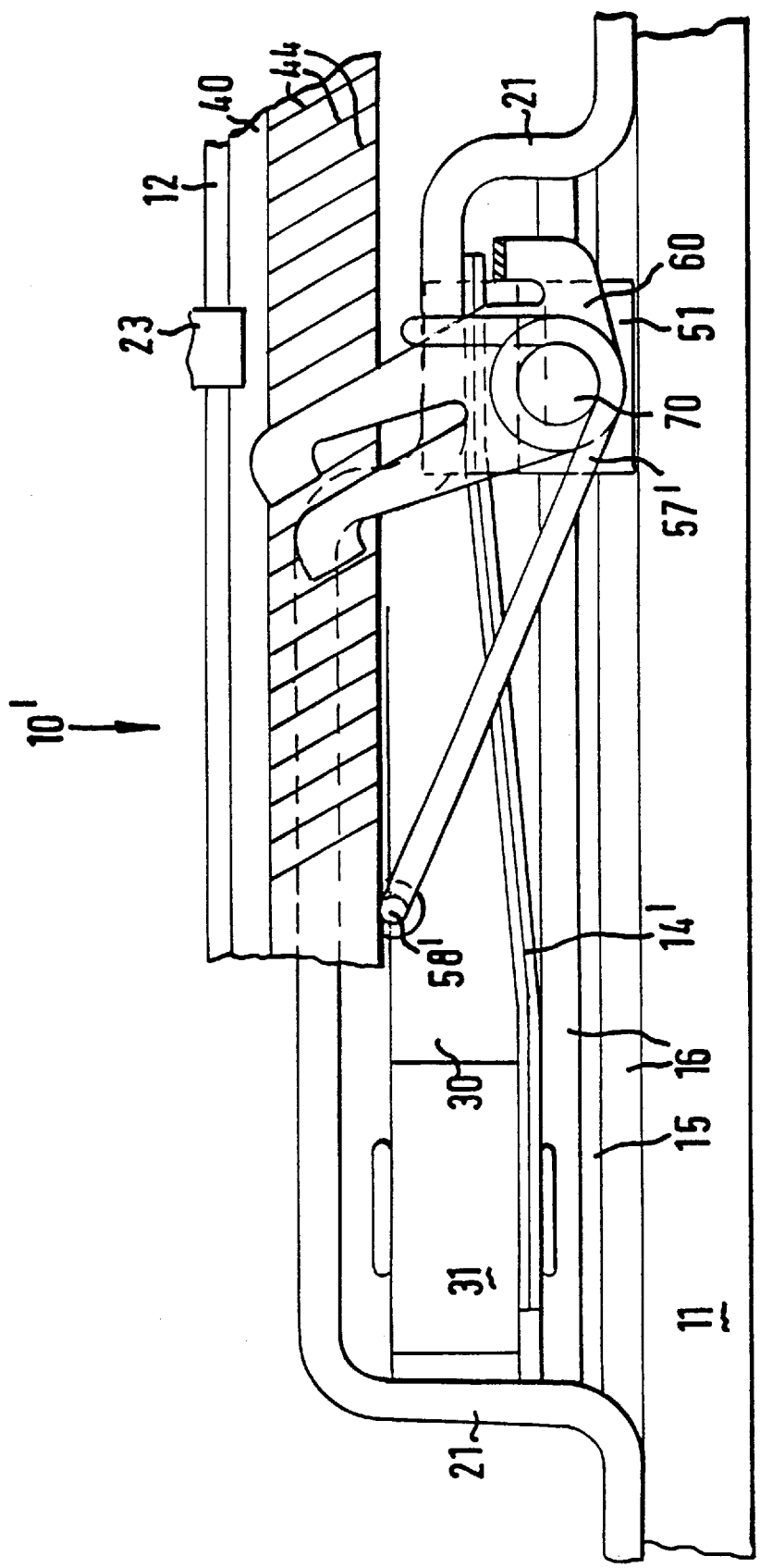
FIG. 7 is a view similar to FIG. 5 of a modified form of the clutch of FIG. 1.
Figure 8:
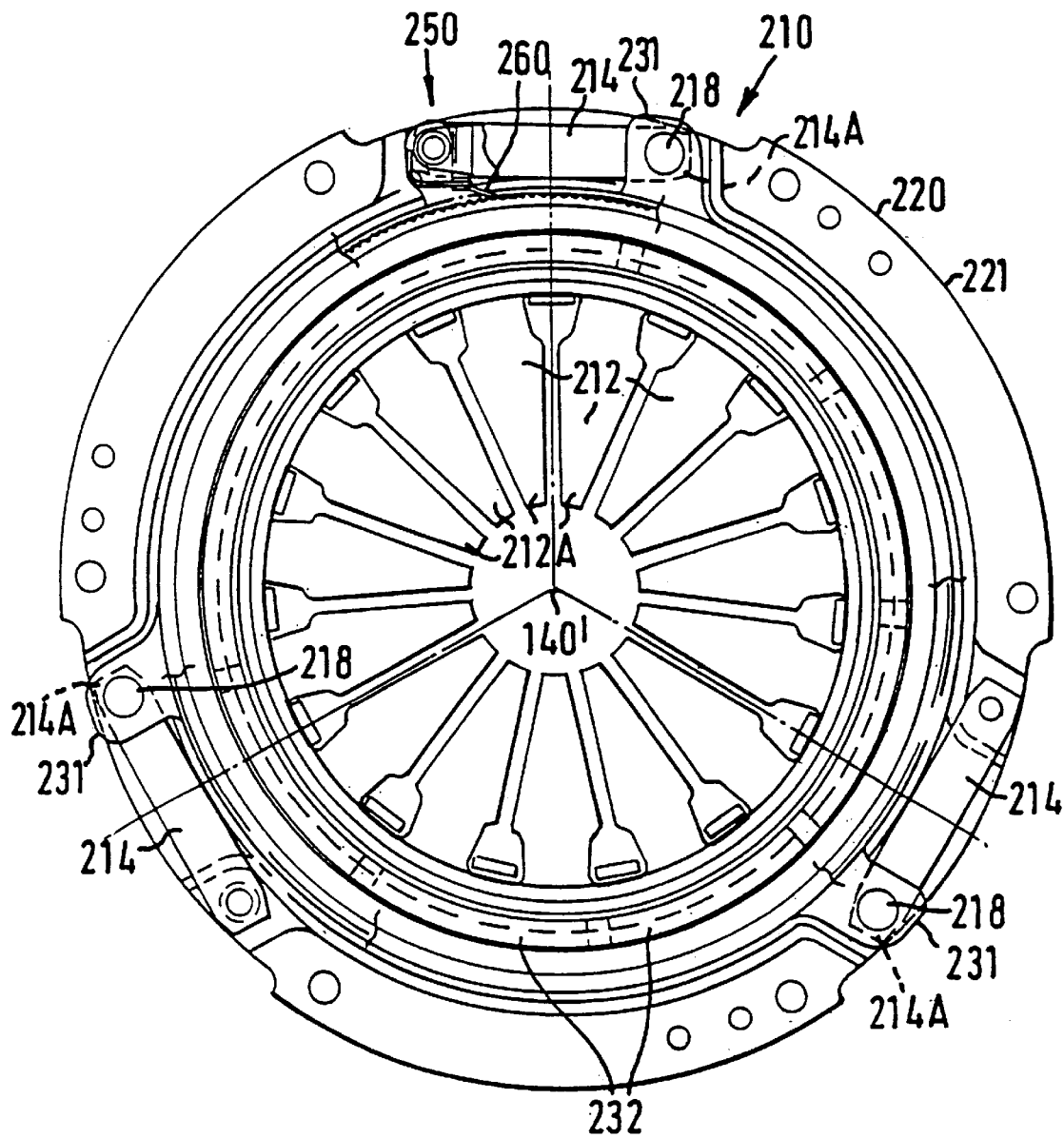
FIG. 8 is an axially partially cutaway view of a second embodiment of an automatically adjusting clutch according to the present invention looking towards an associated engine.
Figure 9:
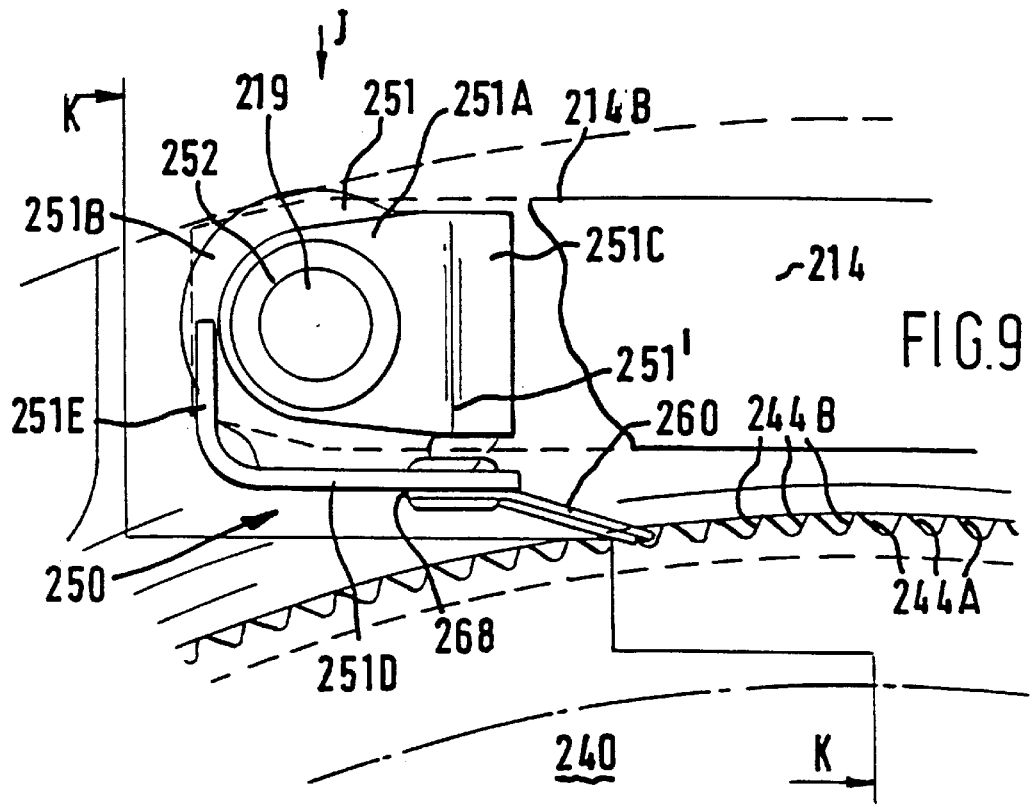
FIG. 9 is an enlarged cutaway view of part of FIG. 8.
Figure 10:
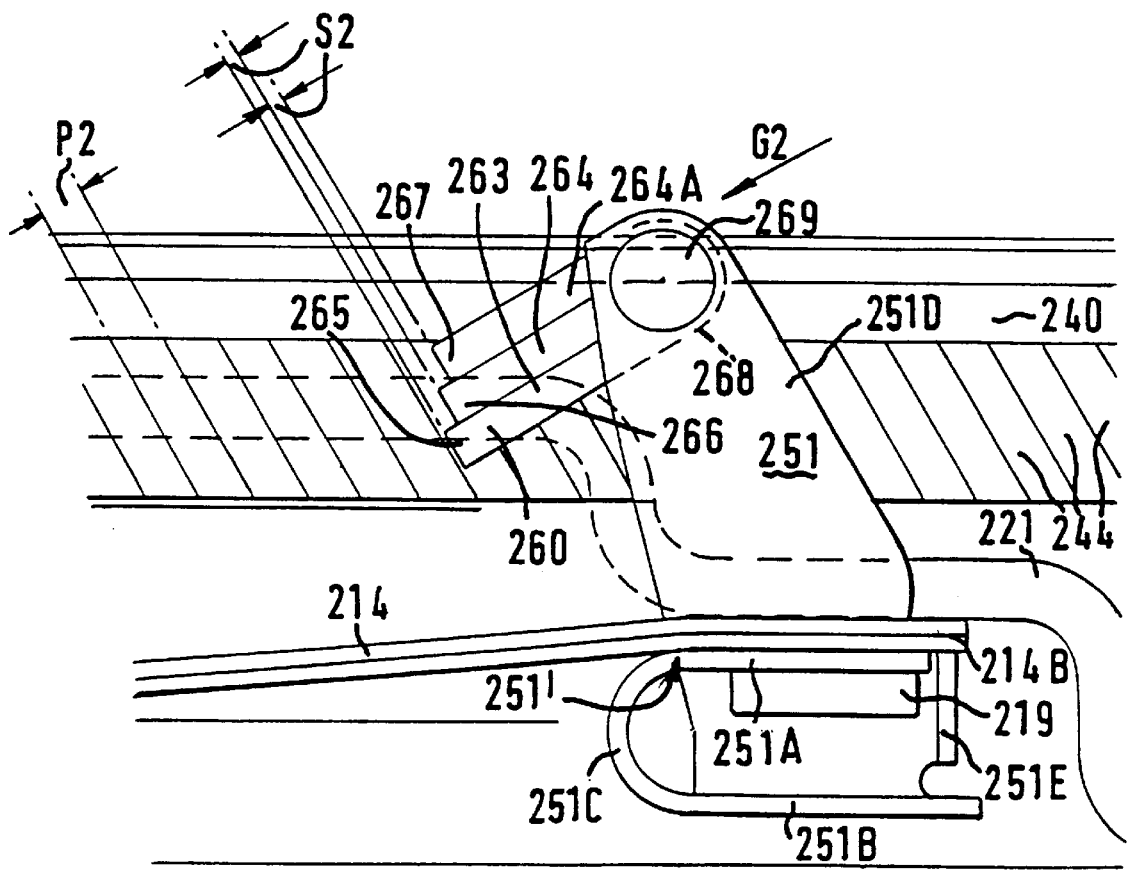
FIG. 10 is a radial view of the clutch of FIG. 8 taken in the direction of the arrow J of FIG. 9.
Figure 11:
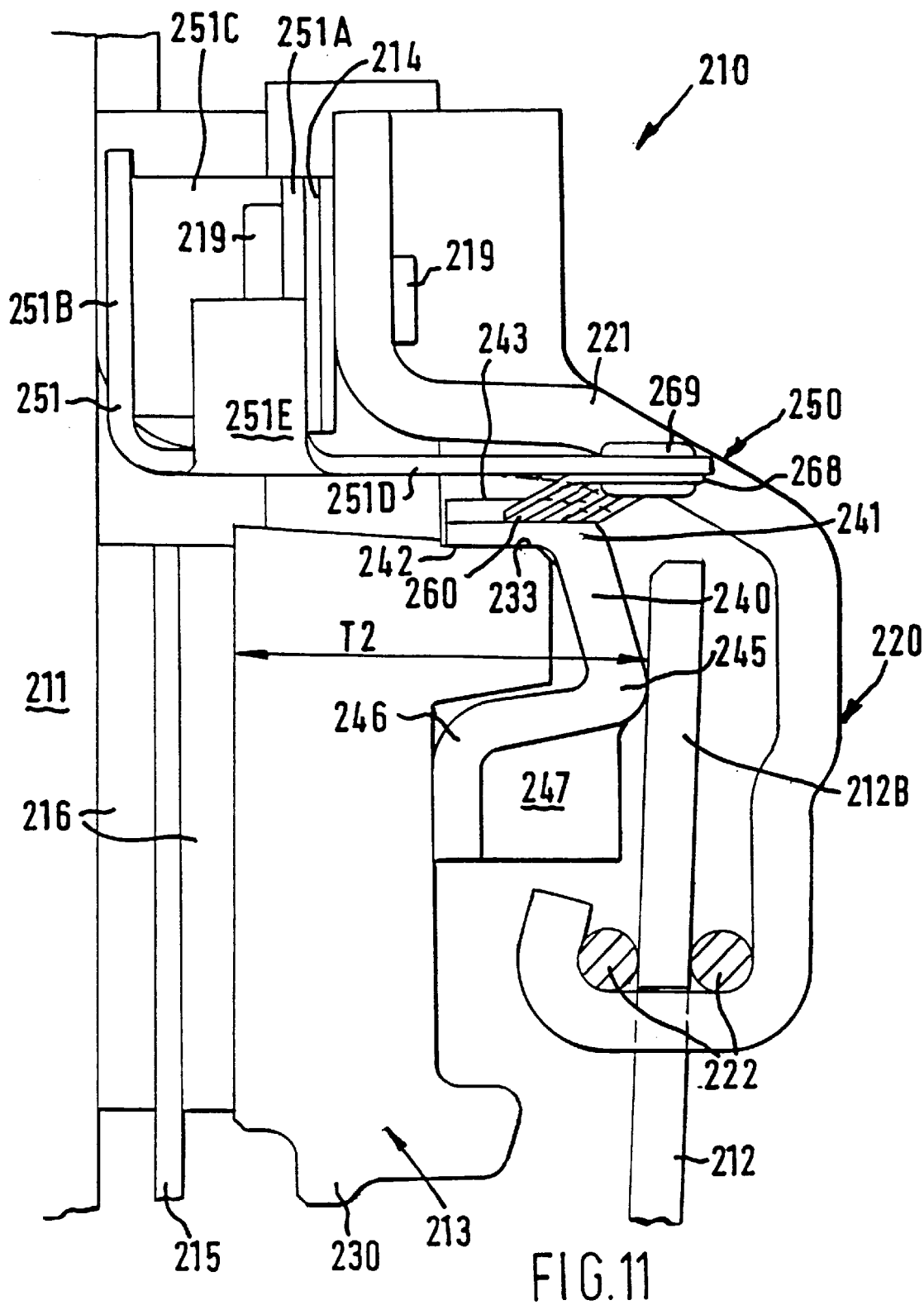
FIG. 11 is a cross section view of the clutch of FIG. 8 taken along the line KK of FIG. 9.

FIG. 7 shows a modified form of automatically adjusting clutch 10' in which one end 58' of each pawl bias means 57'

(only one shown) reacts against the pivot ring 40 to bias the pivot ring 40 away from the flywheel to assist the torque straps 14' in biasing the pressure plate 13 away from the flywheel. This allows the bias load of the torque straps 14' to be less than the corresponding load of torque straps 14. As the associated facings wear the torque strap load produced by torque strap 14' increases, but by a smaller amount than the increase in torque strap load of torque strap 14.

Thus whilst the combined torque strap and pawl bias means axial load of both clutches 10 and 10' is the same with unworn friction facings, the combined axial load with worn friction facings is less on clutch 10' than on clutch 10. This can be advantageous in some circumstances.

The second embodiment of an automatically adjusting clutch 210 shown in FIGS. 8 to 11 is similar to the automatically adjusting clutch 10 of FIGS. 1 to 6 with equivalent components labelled 200 greater.

The main difference being:
a) clutch 210 has only one pawl mechanism 250 with only one pawl means 260;
b) the pawl means 260 has three pawl teeth 265, 266, 267, and
c) the pawl bias means is in the form of bracket 251 of spring steel.

The details of the mechanism 250 can be seen in FIGS. 8 to 11.

The single pawl mechanism 250 comprises pawl means 260 rivetted via pawl rivet 269 to bracket 251.

The pawl means 260 is made from a resilient material typically spring steel and consists of three pawl teeth 265, 266, 267 mounted on respective arms 263, 264, 264A. The arms are all cantilevered from a common fixing portion 268 and can move independently to a limited extent relative to each other in the direction of the axis of pawl rivet 269.

Spring steel bracket 251 comprises rivet portion 251A joined to and substantially parallel with flat portion 251B via a curved portion 251C (which acts as a pawl bias means). Additionally flat portion 251B has a pawl means support portion 251D bent at 90 degrees to it and a further tab portion 251E is bent at 90 degrees to the support portion 251D.

Rivet 219 passes through a hole 252 in rivet portion 251A to secure the spring bracket 251 and end 214B of strap 214 to the clutch cover 221. Curved portion 251C allows flat portion 251B, support portion 251D and tab portion 251E to pivot as a unit to a limited degree relative to rivet portion 251A (typically about the line 251' where the curved portion 251C meets the rivet portion 251A). Such pivotal movement is limited in the direction of arrow G2 of FIG. 10 by tab portion 251E contacting end 214B of strap 214. Indeed when the bracket 251 is manufactured and assembled onto the clutch cover 221 tab portion 251E is arranged to be pre-loaded into contact with end 214B of strap 214 by virtue of stresses in curved portion 251C. Note that the typical pivot 251' of the bracket 251 is inclined (in this case at 90 degrees) to the axis 140' about which pivot ring 140 rotates.

Pawl means 260 is rivetted via rivet 269 to spring bracket 251 to form the pawl mechanism 250.

Pawl means 260 carries out the function of rotating pivot ring 240 when adjustment of the clutch is required.

It can be advantageous to mount all the pawl teeth of the automatically adjusting clutch on one pawl mechanism since the tolerance loop (or tolerance stackup) between all the pawl teeth in relation to the adjuster teeth 244 is greatly reduced.

Each pawl tooth 265, 266 and 267 is permanently engaged with a corresponding adjuster tooth 244 of the pivot ring 240 of the pressure plate 213. The pawl means is arranged such that the pawl teeth 265, 266, 267 are biased (in a direction parallel to the typical axis 251' about which the pawl rotates) into engagement with the array of adjuster teeth 244. Note however that the spacing S2 (see FIG. 10) between teeth 265 and 266 and between teeth 266 and 267 is only ⅓ of the pitch P2 of the adjuster teeth 244. Operation of clutch 210 is similar to the operation of clutch 10.

Thus considering pawl mechanism 250 with the clutch in an unworn condition and engaged, pawl teeth 265, 266 and 267 lie on appropriate flanks 244A.

During clutch disengagement the pawl teeth 265, 266 and 267 slide across corresponding flanks 244A of adjuster teeth 244. During the whole of the disengagement movement of the pivot ring the teeth 265,266 and 267 remain on their appropriate flank 244A.

When the clutch is engaged the pressure plate 13 moves towards the flywheel and the pawl teeth slide relative to the corresponding flanks 244A on adjuster teeth 44 until the fully engaged position is achieved.

Once a predetermined amount of wear of the friction facings 216 has taken place the engaged position of the pivot ring 240 is sufficiently close to the flywheel for the pawl tooth 267, to slide past the corresponding flank 244A and engage with the adjacent edge 244B of the adjuster tooth, in other words the pawl tooth 267 engages behind the corresponding adjuster tooth. This effectively senses that a predetermined amount of wear has taken place.

During the next disengagement of the clutch the pivot ring is moved away from the flywheel under the influence of the torque straps but the pawl tooth 267 is unable to slide past the edge 244B of its engaging adjuster tooth and therefore the pawl means 250 is rotated against the preload stresses of curved portion 251C of bracket 251. Also at the same time the corresponding tab portion 251E disengages the corresponding end 214B of strap 214. Thus the pawl means rotation provides a potential adjustment force.

When the clutch is fully disengaged the pivot ring 240 is no longer clamped between the annular mass 230 and the diaphragm spring 212 and is able to rotate about the clutch axis relative to the first portion under the influence of the stressed curved portion 251C (or pawl bias means) until the corresponding tab portion 251E re-engages with corresponding end 214B of strap 214.

The clutch is designed such that the amount by which the pivot ring 240 is caused to rotate by the pawl means 250 relative to the annular mass 230 produces an increase in effective thickness (T2—see FIG. 11) of the pressure plate 213 substantially equal to the amount of wear of the friction facings 216. Thus when the clutch is re-engaged following an adjustment, the pivot ring 240 and pivot section 245 is axially in its "unworn engaged" position.

Following a further pre-determined amount of wear, a further adjustment of the effective thickness of the pressure plate 213 takes place under the influence of pawl tooth 266.

The next adjustment takes place under the influence of pawl tooth 265. The adjustment sequence then starts again with pawl tooth 267.

Thus the pawl mechanism again provides automatic adjustment of clutch 210.

Figure 1:
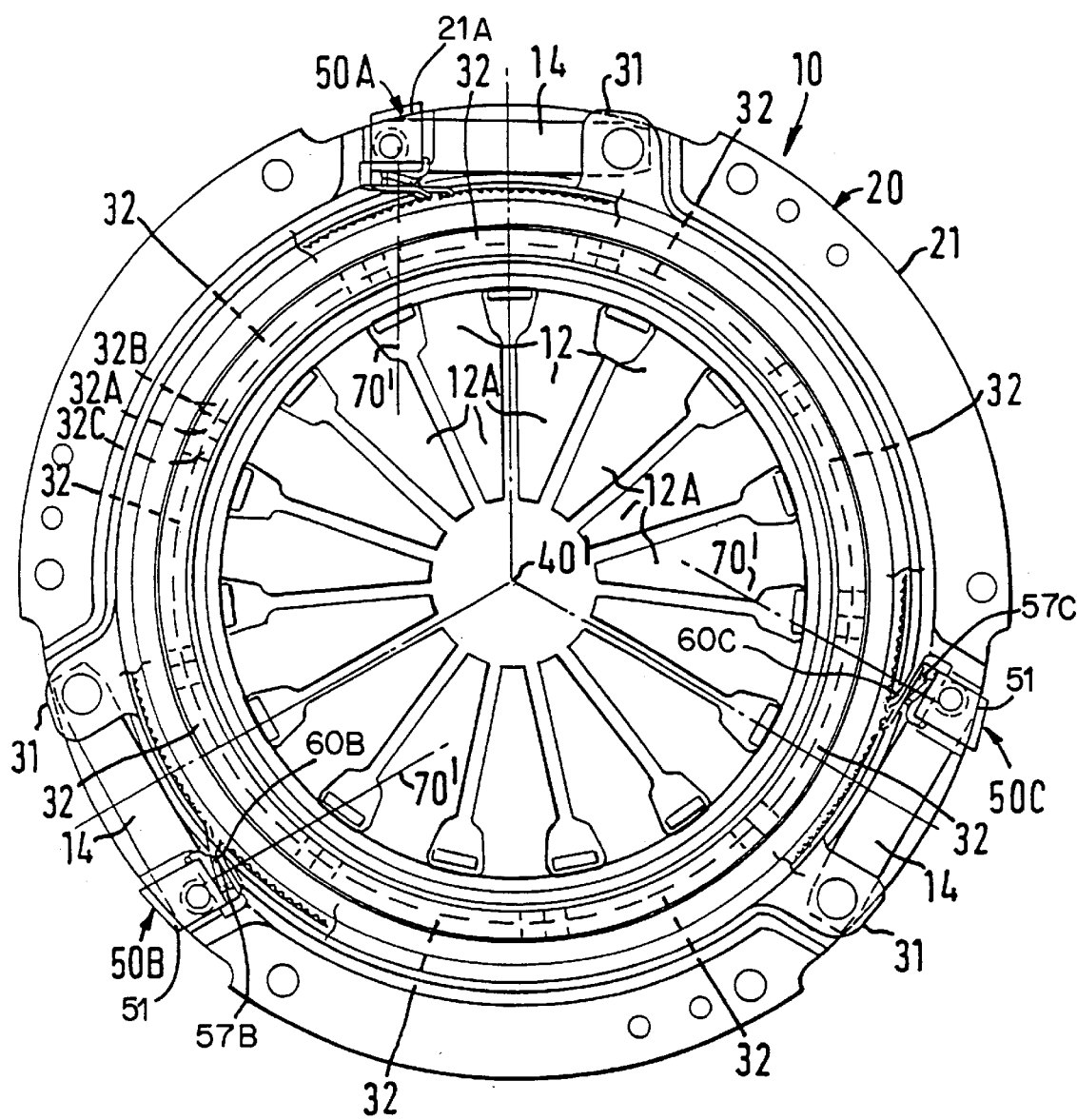
FIG. 1 is an axial partially cutaway view of an automatically adjusting clutch according to the present invention looking towards an associated engine.
Figure 1A:
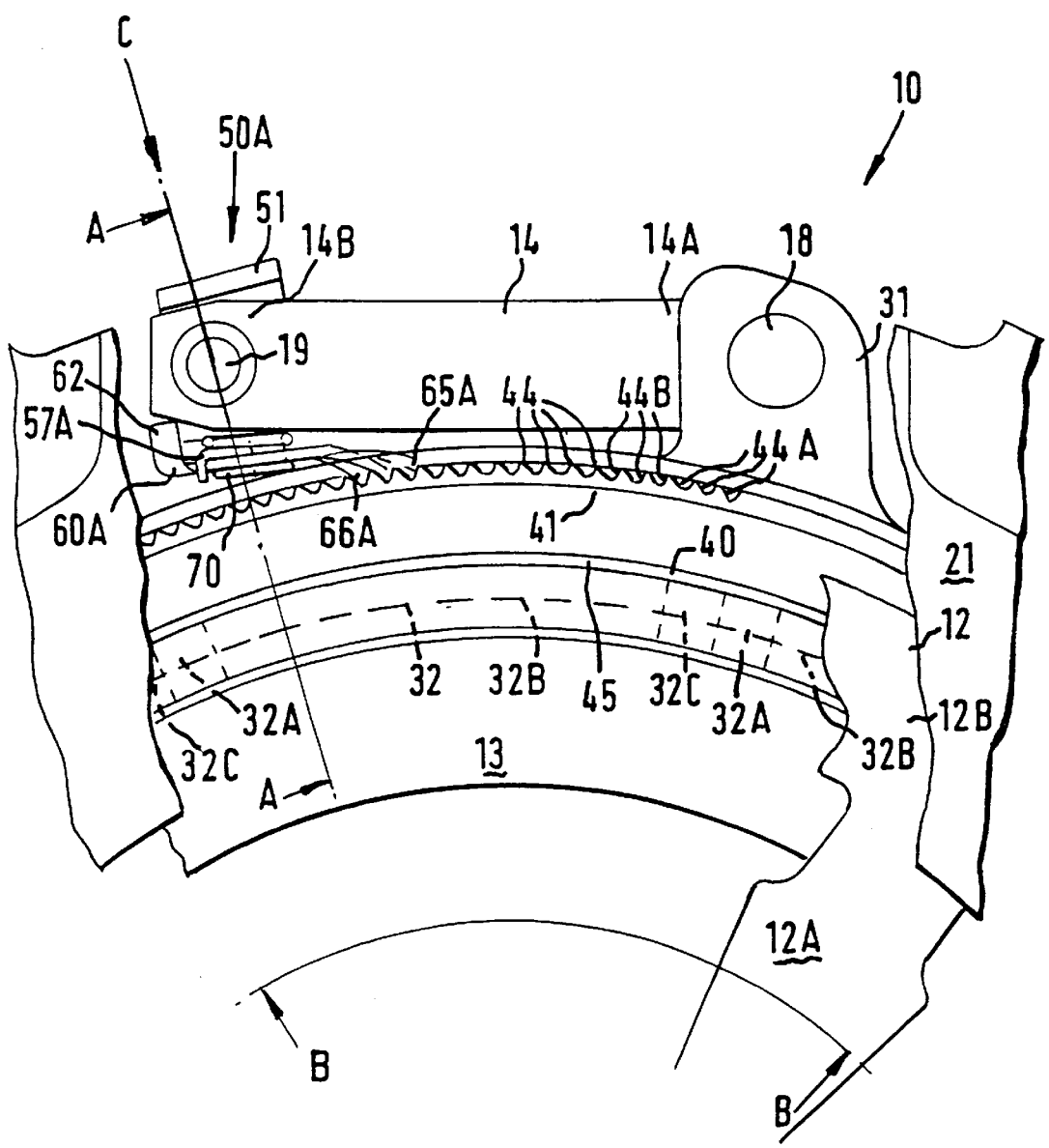
FIG. 1A is an enlarged cutaway view of part of FIG. 1.

FIGS. 12 to 14 show a third embodiment of an automatically adjusting clutch 110 with features which perform substantially the same function as corresponding features in clutch 10 of FIG. 1 labelled 100 greater. In this third embodiment three adjuster means are provided spaced at 120 degree intervals from each other around the clutch cover.

All three adjuster means are identical and therefore only one will be described in detail.

The pawl mechanism 150 of each adjuster has an edge 180 which contacts a corresponding tab 181 of bracket 151 to limit relative rotation of the pawl about axis 70' of pawl rivet 170.

Each pawl means 160 has only one arm 163 and only one pawl tooth 165.

The first part 130 of the pressure plate 113 is annular in shape.

On the axial side of first part 130 remote from the flywheel there are three axial screw threaded bores 134 which are equi-spaced circumferentially around the first part 130.

A second part of the pressure plate in the form of a pivot ring 140 is also annular in shape and has a pivot section 145 situated radially between an outer 185 and inner 186 plate portion. Three equi-spaced slots 187 are formed in the pivot ring 140 opposite the bores 134. Each slot extends in the circumferential direction and has an array of slot teeth 188 on the radial inner edge of the slot (see FIG. 12).

Between each slot 187 and its corresponding bore 134 is an adjuster wheel 190 supported on the first part of the pressure plate 130. A threaded portion 191 of wheel 190 engages the adjacent threaded bore 134 of the first part 130. The adjuster wheel also includes a first toothed wheel 192 and a second toothed wheel 193. Each first toothed wheel 192 has a circumferential array of helical adjuster teeth 144 which are engaged by a corresponding pawl tooth 165.

Each second toothed wheel 193 has a circumferential array of teeth 193A which engage corresponding slot teeth 188. Thus it is apparent that rotation of one adjuster wheel 190 about its own axis 190' will cause circumferential movement of the pivot ring 140 about the clutch axis which in turn will cause rotation of the other two adjuster wheels 190 about their respective axes. This ensures that the first part 130 of the pressure plate always remains parallel to the pivot ring 140.

Rotation of an adjuster wheel 190 about its axis 190' in the direction F1 as a result of wear of the friction facings is effected by the associated pawl 160 engaging the adjuster teeth 144 in a manner similar to that in which rotation of pivot ring 40 of FIG. 1 is effected by pawl 60 and adjuster teeth 44.

Note that the pawl teeth 165 of each adjuster can be in phase with each other in which case each pawl means will rotate its corresponding wheel simultaneously or the pawl teeth 165 of each adjuster could be out of phase in which case one pawl means will rotate its corresponding adjuster wheel which in turn will rotate the pivot ring which in turn will rotate the remaining two adjuster wheels.

Note also that it is possible to ensure permanent engagement of each pawl tooth 165 with a corresponding first toothed wheel 192 by making the pawl means 160 out of a non-resilient material and ensuring each pawl bias means 157 is axially resilient having regard to the axis of rotation of the pawl means, to allow each pawl means 160 to tilt on its corresponding pawl rivet 170.

Note also that the direction of movement (F1) of the adjuster teeth is substantially at 90 degrees to the direction of relative movement between the array and pawl means during a non adjusting clutch engagement (direction X1') or disengagement (direction X1) and axis 170' is not parallel but inclined to the axis 190' about which the wheel 190 rotates.

FIG. 15 shows a fourth embodiment of an automatically adjusting clutch 310 in the engaged and unworn position.

The clutch 310 includes a flywheel 311, a pawl means 350 pivotally mounted about axis 370' on a component axially fixed relative to the flywheel (in this case the clutch cover 321). The pawl means is biased in an anti clockwise direction when viewing FIG. 13. A driven plate 315 is situated between the flywheel and a two part pressure plate 313. Pressure plate 313 consists of annular mass 330 supporting a pivot ring 340 and the effective thickness of the pressure plate can be adjusted to compensate for wear in a manner similar to the automatically adjusting clutch 10.

Note however that the adjuster teeth 344 are parallel to the axis 340' of the pivot ring 340.

The pawl mechanism has a pawl tooth 365 that engages the array of adjuster teeth 344 and also has a foot 390 which engages the face 391 of the annular mass 330. Adjustment is effected in a manner similar to clutch 10 in that following a predetermined amount of wear of the driven plate facings the annular mass rotates the pawl means sufficiently far clockwise when viewing FIG. 15 so that the pawl tooth 365 engages behind an edge of the adjuster tooth. During subsequent disengagement of the clutch the pawl bias means (not shown) acts in an anticlockwise direction on the pawl means and ultimately rotates the pawl tooth anticlockwise to move the array of adjuster teeth in the direction F3.

FIG. 15 also shows the relative position of the pawl tooth and array of adjuster teeth with the unworn clutch engaged (E3) also shown is the relative positions of the pawl tooth and adjuster teeth with the clutch subsequently disengaged (D3). It should be noted that the relative direction of movement between the pawl means and the array of adjuster teeth during engagement of the clutch during a non-adjusting operation is in the direction of arrow X3 and the equivalent relative direction of movement during a non adjusting disengagement of the clutch is in the direction of arrow X3'.

This is because the pawl mechanism 350 rotates with every clutch engagement or disengagement (note that the pawl mechanism 50 only rotates during a disengagement when an adjustment is taking place, during all non adjusting clutch actuation the pawl mechanism 50 does not rotate).

Note that the direction F3 is substantially at 90 degrees to the direction Z3 (the direction of movement of the array of adjuster teeth during a non adjusting clutch engagement or disengagement operation). Also the direction F3 is inclined to the direction X3 and X3' at an angle which is not 90 degrees (contrast this with the angle between direction F and directions X1 and X1' of the first embodiment described (see FIG. 6)).

Furthermore the edges 344B of the adjuster teeth 344 are inclined at the acute angle Y3 to the directions X3 and X3'.

It is apparent that for all automatically adjusting clutches described above and further automatically adjusting clutches in accordance with the present invention that:

a) there can be any number of adjuster means per clutch;

b) if a clutch contains a plurality of adjuster means, the adjuster means can be interconnected to adjust simultaneously;

c) each pawl means can have any number of pawl teeth;

d) if a clutch contains a plurality of pawl teeth each pawl tooth can be in phase or out of phase with any other pawl tooth of the clutch;

e) the adjuster teeth of an array can be straight cut i.e. the adjuster teeth are parallel with the axis about which the array rotates during adjustment or the adjuster teeth could be inclined to the said axis of the array for example helical teeth;

f) adjustment of the pivot ring can take place in the direction of engine rotation relative to the first portion or contrary to the direction of engine rotation;

g) some designs may be such that over the service life of the clutch not all the adjuster teeth are engaged by a pawl tooth. Thus such non-engaging teeth need not actually be formed for example not all 241 adjuster teeth of the embodiment of the invention shown in FIG. 1 need be formed onto the pivot ring 40, only those teeth engaged by and therefore local to the pawl means 60A, 60B and 60C are required, and h) it may still be advantageous to form redundant adjuster teeth to aid assembly, for example if all 241 teeth of FIG. 1 are formed, the pivot ring 40 can be assembled against the first portion 30 in any of nine different ways corresponding to the nine corresponding undulations 32 and 47.

From the above description it is apparent that embodiments of the present invention are simple and cheap to produce. They can also be designed to utilise existing components from similar sized non-adjusting clutches. In particular existing diaphragm springs and clutch covers designed for use in non-adjusting clutches can be used in embodiments of the present invention with no or minimal modifications. This has the significant advantage of being able to use the existing (and very expensive) blanking tools and heat treatment dies when making the diaphragm springs and of being able to use the existing (and very expensive) press tools when making the clutch cover.

I claim:

1. An automatically adjusting clutch in which a pressure plate is biased axially towards a flywheel by a main clutch engaging spring means to clamp a driven plate between the pressure plate and flywheel to engage the clutch, a first part of the pressure plate which is moveable by adjuster means relative to a second part of the pressure plate to increase the effective axial thickness of the pressure plate to compensate for the wear of the driven plate, the adjuster-means having an array of adjuster teeth which are disposed circumferentially around a component which is rotatable about an axis parallel to the axis or rotation of the clutch and pawl means which moves relative to and in contact with the array as the pressure plate moves relative to the flywheel, the pawl means and array being arranged so that if movement of the pressure plate towards the flywheel during clutch engagement exceeds a predetermined distance, indicating a predetermined amount of wear of the driven plate, the pawl means moves sufficiently over the array to engage behind a tooth of the array so that subsequently the pawl means moves the first part of the pressure plate relative to the second part to make said wear adjustment.

2. A clutch according to claim 1 in which the pawl means is pivotally mounted on a component which is axially fixed relative to the flywheel.

3. A clutch according to claim 1 in which there is a single pawl means.

4. A clutch according to claim 1 in which a plurality of pawl means are disposed at circumferentially spaced locations around the pressure plate.

5. A clutch according to claim 1 in which when in the engaged state at least one pawl means is held against a stop by the appropriate pawl bias means and when the pawl means engages behind a tooth as a result of wear of the clutch, the pawl means is pivoted away from the stop during subsequent disengagement of the clutch against the pawl bias means to provide the potential adjustment force.

6. A clutch according to claim 1 in which the pawl bias means also reacts against a component of the pressure plate to assist in moving the pressure plate away from the flywheel during clutch disengagement.

7. A clutch according to claim 1 in which at least one of the or each pawl means includes a plurality of pawl teeth which move relative to the adjuster teeth.

8. A clutch according to claim 3 in which the pawl means has three pawl teeth which move relative to the adjuster teeth.

9. A clutch according to claim 1 in which the adjuster teeth of the array are disposed at an angle inclined to an axis about which the array rotates during adjustment.

10. A clutch according to claim 1 in which the adjuster means includes at least two pawl teeth mutually spaced relative to the adjuster teeth at fractional multiples of the pitch of the adjuster teeth so that when one pawl tooth engages behind a given adjuster tooth the other pawl tooth is part way along a flank of the given or another adjuster tooth.

11. A clutch according to claim 1 in which three pawl teeth are mutually spaced relative to the adjuster teeth at one third fractional multiples of the pitch of the adjuster teeth so that when one pawl tooth engages behind a given adjuster tooth, the other two pawl teeth are one third and two thirds along a flank of the given or another adjuster tooth.

12. A clutch according to claim 1 in which the adjuster teeth extend circumferentially around some or all of the pressure plate.

13. A clutch according to claim 1 in which the two parts of the pressure plate move circumferentially relative to each other over axially ramped portions to increase the effective axial thickness of the pressure plate.

14. A clutch according to claim 13 in which there are mutually engaging serrations on at least two adjacent components in the clamp load path between the main clutch engaging spring means and that portion of the pressure plate which engages the clutch driven plate to prevent reverse relative circumferential movement of the first part relative to the second part.

15. A clutch according to claim 1 in which the adjuster teeth are spaced circumferentially around an adjuster wheel which is in screw-threaded engagement with an axially extending bore in the pressure plate, the main clutch engaging spring applying the clutch engaging force to the pressure plate via the adjuster wheel, and the pawl means being arranged to rotate the adjuster wheel relative to the pressure plate to adjust the effective axial thickness of the pressure plate following engagement behind a tooth.

16. A clutch according to claim 15 in which a plurality of adjuster wheels are provided at circumferentially spaced locations around the pressure plate each with its own pawl means, the adjuster wheels being interconnected so that rotation of one adjuster wheel by its associated pawl means also rotates all the other adjuster wheels to ensure even adjustment of the effective axial thickness of the pressure plate.

17. A clutch according to claim 16 in which the adjuster wheels are interconnected by a toothed ring which engages a toothed formation on each adjuster wheel.

18. A clutch according to claim 1 in which stop means is provided to limit the maximum movement of the pressure plate away from the flywheel in order to limit the movement of the pawl means when engaged behind a tooth, thus limiting the relative movement of the two parts of the pressure plate during a pressure plate thickness adjustment.

19. A clutch according to claim 1 in which the pressure plate is retracted away from the flywheel and the driven plate by a resilient torque strap which connects the pressure plate with an associated clutch cover, the pawl means being attached to the clutch cover via fastening means which also attaches the torque strap to the cover.

20. An automatically adjusting clutch in which a pressure plate is biased axially towards a flywheel by a main clutch engaging spring means to clamp a driven plate between the pressure plate and flywheel to engage the clutch, a first part of the pressure plate which is moveable by adjuster means relative to a second part of the pressure plate to increase the effective axial thickness of the pressure plate to compensate for the wear of the driven plate, the adjuster-means having an array of adjuster teeth and pawl means which moves relative to and in contact with the array as the pressure plate moves relative to the flywheel, the pawl means and array being arranged so that if movement of the pressure plate towards the flywheel during clutch engagement exceeds a predetermined distance, indicating a predetermined amount of wear of the driven plate, the pawl means moves sufficiently over the array to engage behind a tooth of the array so that subsequently the pawl means moves the first part of the pressure plate relative to the second part to make said wear adjustment, the direction of movement of the array during an adjustment operation being substantially at 90 degrees to the axis of rotation of the clutch.

21. An automatically adjusting clutch in which a pressure plate is biased axially towards a flywheel by a main clutch engaging spring means to clamp a driven plate between the pressure plate and flywheel to engage the clutch, a first part of the pressure plate which is moveable by adjuster means relative to a second part of the pressure plate to increase the effective axial thickness of the pressure plate to compensate for the wear of the driven plate, the adjuster-means having an array of adjuster teeth and pawl means which moves relative to and in contact with the array as the pressure plate moves relative to the flywheel, the pawl means and array being arranged so that if movement of the pressure plate towards the flywheel during clutch engagement exceeds a predetermined distance, indicating a predetermined amount of wear of the driven plate, the pawl means moves sufficiently over the array to engage behind a tooth of the array so that subsequently the pawl means moves the first part of the pressure plate relative to the second part to make said wear adjustment, the direction of movement of the array during an adjustment operation of the clutch being inclined to the direction of relative movement between the array and the pawl means during a non adjusting clutch engagement or disengagement operation.

22. A clutch as defined in claim 21 in which during an adjustment operation of the clutch the direction of movement of the array is substantially at 90 degrees to the direction of relative movement between the array and the pawl means during a non adjusting clutch engagement or disengagement operation.

23. An automatically adjusting clutch in which a pressure plate is biased axially towards a flywheel by a main clutch engaging spring means to clamp a driven plate between the pressure plate and flywheel to engage the clutch, a first part of the pressure plate which is moveable by adjuster means relative to a second part of the pressure plate to increase the effective axial thickness of the pressure plate to compensate for the wear of the driven plate, the adjuster-means having an array of adjuster teeth and pawl means which moves relative to and in contact with the array as the pressure plate moves relative to the flywheel, the pawl means and array being arranged so that if movement of the pressure plate towards the flywheel during clutch engagement exceeds a predetermined distance, indicating a predetermined amount of wear of the driven plate, the pawl means moves sufficiently over the array to engage behind a tooth of the array so that subsequently the pawl means moves the first part of the pressure plate relative to the second part to make said wear adjustment, the relative direction of movement between the pawl means and the array of adjuster teeth during a non adjusting clutch engagement or disengagement being at an inclined acute angle to the edge of the adjuster tooth.

24. An automatically adjusting clutch in which a pressure plate is biased axially towards a flywheel by a main clutch engaging spring means to clamp a driven plate between the pressure plate and flywheel to engage the clutch, a first part of the pressure plate which is moveable by adjuster means relative to a second part of the pressure plate to increase the effective axial thickness of the pressure plate to compensate for the wear of the driven plate, the adjuster-means having an array of adjuster teeth which during adjustment rotate about a first axis and pawl means which moves relative to and in contact with the array about a second axis, which is inclined at an angle to the first axis, as the pressure plate moves relative to the flywheel the pawl means and array being arranged so that if movement of the pressure plate towards the flywheel during clutch engagement exceeds a predetermined distance, indicating a predetermined amount of wear of the driven plate, the pawl means moves sufficiently over the array to engage behind a tooth of the array so that subsequently the pawl means moves the first part of the pressure plate relative to the second part to make said wear adjustment.

25. An automatically adjusting clutch in which a pressure plate is biased axially towards a flywheel by a main clutch engaging spring means to clamp a driven plate between the pressure plate and flywheel to engage the clutch, the clutch including a plurality of adjuster means disposed at circumferentially spaced locations around the pressure plate to adjust the effective axial thickness of the pressure plate to compensate for wear of the driven plate, the individual adjuster means circumferentially interconnected by a circumferential interconnecting means which is rotated by at least one adjuster means to ensure circumferentially equal adjustment of the effective axial thickness of the pressure plate.

26. An automatically adjusting clutch having a pressure plate which is held rotationally fast with a clutch cover via torque straps, the clutch also including at least one driven plate wear sensing means which is attached to the clutch cover via fastening means which also attaches one of the torque straps to the cover.

27. An automatically adjusting clutch having a pressure plate which is held rotationally fast with a clutch cover via torque straps, the clutch also including at least one device which effects adjustment of the clutch to compensate for wear which is attached to the clutch cover via fastening means which also attaches one of the torque straps to the cover.

28. A clutch according to claim 9 in which the adjuster teeth are helical teeth.

* * * * *